US011533303B2

(12) United States Patent
Circosta et al.

(10) Patent No.: US 11,533,303 B2
(45) Date of Patent: Dec. 20, 2022

(54) CONVERSATION MERGING FOR ELECTRONIC DEVICES

(71) Applicant: Apple Inc., Cupertino, CA (US)

(72) Inventors: Nicholas Joseph Circosta, Mountain View, CA (US); Patrick Burns, San Jose, CA (US); Bhaskar Sarma, Santa Clara, CA (US); Daniel B. Pollack, San Jose, CA (US); Liang Qu, Sunnyvale, CA (US); Kevin Lindeman, Morgan Hill, CA (US); Roberto Garcia, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 17/222,922

(22) Filed: Apr. 5, 2021

(65) Prior Publication Data

US 2021/0297407 A1     Sep. 23, 2021

Related U.S. Application Data

(63) Continuation of application No. 16/147,553, filed on Sep. 28, 2018, now Pat. No. 10,972,454.
(Continued)

(51) Int. Cl.
*H04L 29/06* (2006.01)
*H04L 9/40* (2022.01)
(Continued)

(52) U.S. Cl.
CPC ........ *H04L 63/0815* (2013.01); *H04L 9/3263* (2013.01); *H04L 12/282* (2013.01);
(Continued)

(58) Field of Classification Search
None
See application file for complete search history.

(56) References Cited

U.S. PATENT DOCUMENTS 9,461,833 B1 ‡   10/2016   Marra ..................... H04L 67/26
9,871,752 B2 ‡   1/2018   Bartkiewicz ............ G06F 15/16
(Continued)

FOREIGN PATENT DOCUMENTS

CN           1565137        1/2005
CN         101179630        5/2008
(Continued)

OTHER PUBLICATIONS

Chadwick, David W.; Inman, George. Attribute Aggregation in Federated Identity Management. Computer, vol. 42, Issue: 5. https://ieeexplore.ieee.org/stamp/stamp.jsp?tp=&arnumber=5070036 (Year: 2009).*

(Continued)

*Primary Examiner* — Jeremiah L Avery
(74) *Attorney, Agent, or Firm* — BakerHostetler

(57) ABSTRACT

Aspects of subject technology provide systems and methods for generation and distribution of a stable identifier associated with multiple aliases of a user account. The stable identifier may be provided to various electronic devices by a server, responsive to requests associated with communications to those devices from one of the associated aliases. In this way, messaging applications can utilize the stable identifier to merge conversations from a single user having multiple aliases, and secure access to a secure device can be provided to an authorized user, even if the authorized user attempts access from an unauthorized account alias.

20 Claims, 8 Drawing Sheets

Related U.S. Application Data

(60) Provisional application No. 62/677,627, filed on May 29, 2018.

(51) Int. Cl.
  *H04L 12/28* (2006.01)
  *H04L 9/32* (2006.01)
  *H04L 51/42* (2022.01)
  *H04L 51/56* (2022.01)

(52) U.S. Cl.
  CPC .......... *H04L 12/2814* (2013.01); *H04L 51/42* (2022.05); *H04L 51/56* (2022.05)

(56) References Cited

U.S. PATENT DOCUMENTS

| | | | |
|---|---|---|---|
| 2001/0039203 A1 | 11/2001 | Brown | |
| 2006/0101115 A1* | 5/2006 | Gleckman | G06Q 10/107 709/203 |
| 2015/0370615 A1* | 12/2015 | Pi-Sunyer | H04L 12/2823 719/328 |
| 2016/0191578 A1‡ | 6/2016 | Kim | H04L 51/04 709/204 |
| 2017/0111298 A1‡ | 4/2017 | Tomkins | H04L 51/32 |
| 2017/0366482 A9‡ | 12/2017 | Malik | H04L 51/04 |

FOREIGN PATENT DOCUMENTS

| | | |
|---|---|---|
| CN | 101855890 | 10/2010 |
| CN | 106171038 | 11/2016 |
| CN | 106790171 | 5/2017 |

OTHER PUBLICATIONS

Ahmad, Zubair et al. User requirement model for federated identities threats. 2010 3rd International Conference on Advanced Computer Theory and Engineering(ICACTE). https://ieeexplore.ieee.org/stamp/stamp.jsp?tp=&arnumber=5579819 (Year: 2010).*

Grailet, Jean-François; Donnet, Benoit. Towards a renewed alias resolution with space search reduction and IP fingerprinting. 2017 Network Traffic Measurement and Analysis Conference (TMA). https://ieeexplore.ieee.org/stamp/stamp.jsp?tp=&arnumber=8002907 (Year: 2017).‡

Vieira, Marcos R. et al. Querying Spatio-temporal Patterns in Mobile Phone-Call Databases. 2010 Eleventh International Conference on Mobile Data Management. https://ieeexplore.ieee.org/stamp/stamp.jsp?tp=&arnumber=5489659 (Year: 2010).‡

Grailet, et al., "Towards a renewed alias resolution with space search reduction and IP fingerprinting," 2017 Network Traffic Measurement and Analysis Conference (TMA), retrieved from https://ieeexplore.ieee.org/stamp/stamp.jsp?tp=&arnumber=8002907.

Vieira, et al., "Querying Spatio-temporal Patterns in Mobile Phone-Call Databases," 2010 Eleventh International Conference on Mobile Data Management, retrieved from https://ieeexplore.ieee.org/stamp/stamp.jsp?tp=&arnumber=5489659.

Chinese Office Action from Chinese Patent Application No. 201910447601.X, dated Sep. 24, 2021, 27 pages including machine-generated English language translation.

\* cited by examiner
‡ imported from a related application

CONVERSATION MERGING FOR ELECTRONIC DEVICES

CROSS-REFERENCE TO RELATED APPLICATIONS

The present application is a continuation of U.S. patent application Ser. No. 16/147,553, entitled "Conversation Merging for Electronic Devices," filed on Sep. 28, 2018, which claims the benefit of U.S. Provisional Patent Application Ser. No. 62/677,627, entitled "Conversation Merging for Electronic Devices," filed on May 29, 2018, each of which is hereby incorporated by reference in its entirety for all purposes.

TECHNICAL FIELD

The present description relates generally to electronic messaging with electronic devices, and more particularly to conversation merging for electronic devices.

BACKGROUND

Messaging applications can provide the ability for person-to-person communication for users of electronic devices. Texts messages and images can be transmitted using messaging applications. Messaging applications for electronic devices commonly provide a keyboard interface and a message stream display in which a user of an electronic device can conduct a messaging conversation with a user of a remote device. Messaging applications may display a messaging conversation for each account alias from which incoming messages are received.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
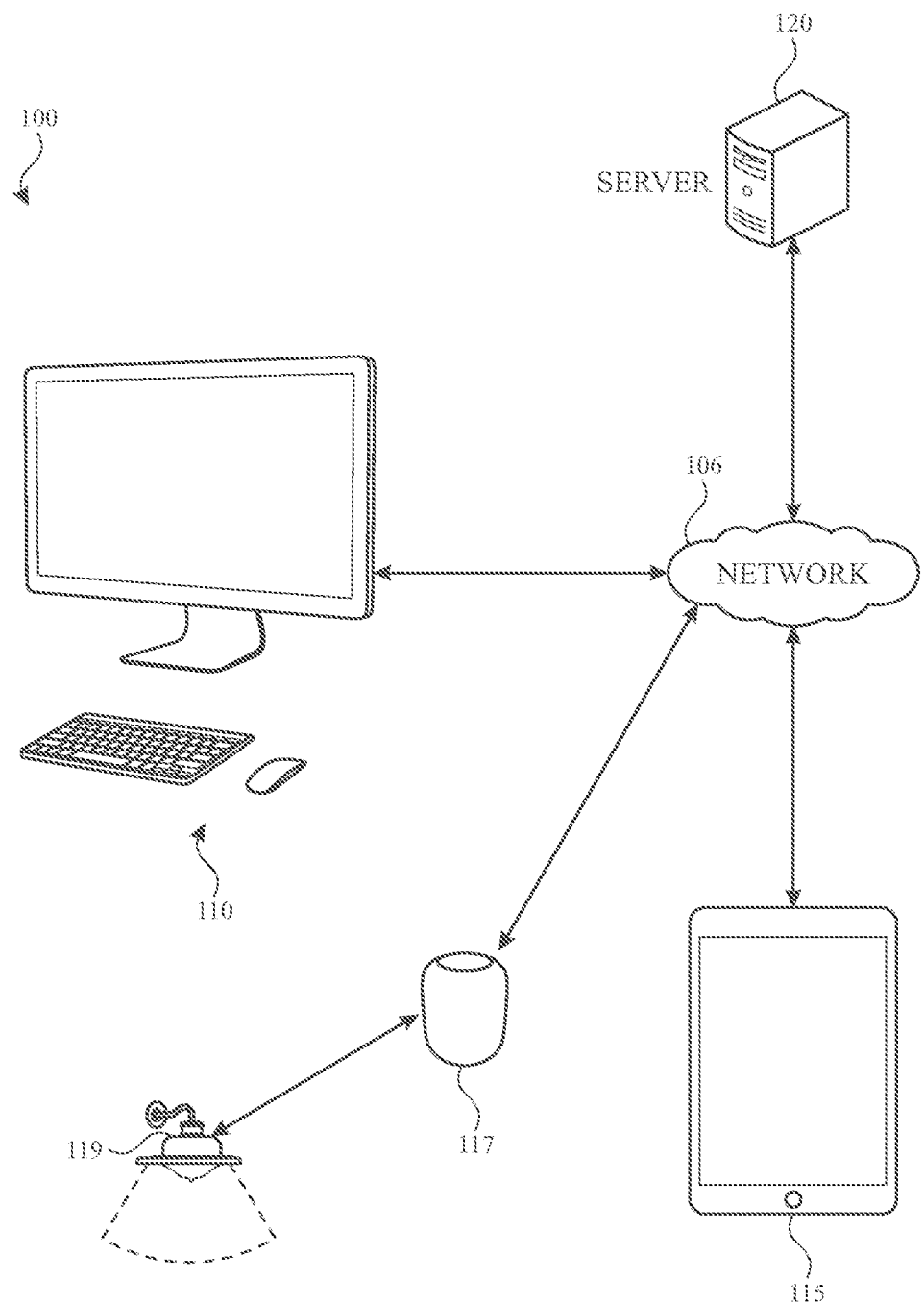
FIG. 1 illustrates an example network environment in which conversation merging may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Messaging applications for electronic devices allow exchanges of information between remote electronic devices, such as text exchanges, media exchanges, and the like. The text and media exchanges generate a messaging stream between the devices that forms a messaging conversation. The messaging conversation is typically displayed in a messaging stream view or conversation view in which outgoing and incoming messages are displayed in association with an account alias associated with the sender of an incoming message. The outgoing and incoming messages can be exchanged over cellular communications networks, wireless or wired local communications channels (e.g., Bluetooth or other direct peer-to-peer communications, or communications via a local area network), or over wide-area networks such as the Internet and leveraging mobile communications protocols.

When a user of an electronic device sends a message to another user of another electronic device, the sending user (the sender) commonly addresses the message to the other user with an account alias, such as a telephone number or an email address for that user. Each user can have multiple account aliases associated with a user account (e.g., an account with a messaging server, a device server, a cloud server, or other account server). Over time, the set of account aliases for a particular user's account can change. For example, the user may change a subscriber identity module (SIM) (e.g., due to a change in wireless carrier or use of a temporary number such as an international number). As another example, the user may remove an email address and add a new email address. As another example, one or more of the account aliases may temporarily or permanently become unavailable for use due to a network, server, or device operational error.

When a sending device, or a server that is managing messaging communication between devices, is unable to send a message from an account alias that the sending user has used previously, the message may be sent from a next available alias. For example, if the message cannot be sent from the user's account using the telephone number alias, the message may be sent from the user's email address alias.

However, when the receiving device receives two messages from two different account aliases of the sending user, the receiving device often forks the messaging thread from that single sender into two messaging conversations, each associated with one of the account aliases. This can be inconvenient and/or confusing to the receiving user as the content of a single messaging conversation is stored and displayed in two different streams which have to be accessed separately, and the receiving user may not even realize that the sending user is associated with one of the account aliases.

Some embodiments provide messaging for electronic devices in which a sender of a message is identified by a stable identifier, sometimes referred to herein as a merge identifier, rather than an account alias for the sender. This allows for technologies that take advantage of this feature to interpret messages from the same logical person or account together, rather than individually.

Merge identifiers are described herein in connection with various examples associated with electronic messaging. However, it should also be appreciated that merge identifiers as described herein can also be useful in other contexts such as in the operation of a home-control device such as a WiFi-connected smart speaker, or other multi-media device that is communicatively coupled (e.g., by a wired or wireless connection) with one or more smart appliances at the location of the home-control device (e.g., in the same home, house, apartment, room, building, office, etc.).

FIG. 1 illustrates an example network environment 100 in which merge identifiers for messaging and other applications such as home control operations may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, a home-control device 117, a smart appliance 119, and a server 120. The network 106 may communicatively (directly or indirectly) couple the electronic device 110 and/or the server 120, the electronic device 115 and/or the server 120, the electronic device 110 and/or the electronic device 115, the electronic device 110 and/or the home-control device 117, the electronic device 115 and/or the home-control device 117, and/or the server 120 and/or the home-control device 117.

The home-control device 117 and the smart appliance 119 may be communicatively coupled via a wired or wireless connection such as a peer-to-peer (e.g., near field communications or direct WiFi) connection, via a local area network, and/or via the network 106 and/or server 120. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, a home-control device 117, a smart appliance 119, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed below with respect to FIG. 8. In one or more implementations, the electronic device 110 may provide a messaging application for exchanging messages over the network 106 with electronic device 115 (e.g., via server 120).

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In FIG. 1, by way of example, the electronic device 115 is depicted as a tablet device with a touchscreen. In one or more implementations, the electronic device 115 may be, and/or may include all or part of the electronic system discussed below with respect to FIG. 8. In one or more implementations, the electronic device 115 may also provide a messaging application for exchanging messages over the network 106 with electronic device 110 (e.g., via server 120).

The home-control device 117 may include a wireless interface and may be, for example, a dedicated device such as a smart speaker or a smart television configured to receive voice or other audible input or a media-interface device such as a receiver device for a television having one or more applications configured to receive media input from various content providers or from electronic device 110 or electronic device 115 for display on the television. In FIG. 1, by way of example, the home-control device 117 is depicted as a smart speaker. In some implementations, home-control device 117 may be implemented with software running on a laptop computer, a smartphone, a tablet device, a wearable device such as a watch, a band, and the like, any other appropriate device that includes, for example, wireless interface(s) and/or input components for receiving control input from a user and providing control commands, based on the control input and/or programmed settings, to one or more smart appliances such as smart appliance 119. In one or more implementations, the home-control device 117 may be, and/or may include all or part of the electronic system discussed below with respect to FIG. 8. In one or more implementations, the electronic device 115 may also provide user interface (e.g., over the network 106) for control of one or more smart appliances such as smart appliance 119.

Smart appliance 119 is operable by home-control device 117 and may be implemented as, for example, a television, one or more light fixtures having one or more light-bulbs (e.g., incandescent, fluorescent, LED, or other light sources), a washing machine, a dryer, a refrigerator, a heater, an air conditioner, a fan, one or more security system components, one or more alarms, and/or one or more cameras (as examples). In FIG. 1, by way of example, the smart appliance 119 is depicted as a smart light fixture having a light bulb that is controllable (e.g., directly or via the fixture) by home-control device 117.

In one or more implementations, the server 120 manages secure exchange of messages and/or other information between electronic device 110 and electronic device 115, between electronic device 110 and home-control device 117, and/or between electronic device 115 and home-control device 117. In one or more implementations, the server 120 may store account information for each of electronic devices 110 and 115 and/or for a user associated with each of electronic devices 110 and 115. For example, the server 120 may store a unique account identifier for each account of each user. The unique identifier may be a user-selected login identifier or a server-generated identifier for the account.

The server 120 may also store one or more account aliases (e.g., one or more telephone numbers and/or one or more email addresses) for each unique account identifier. The server 120 may also store a merge identifier for any unique account identifier that has multiple associated account aliases. The merge identifier may be, for example, a pseudo-randomly generated identifier that is mapped on server 120 to a user's unique (permanent) identifier. A pseudo-random merge identifier is different from the unique identifier itself and is a deterministic value, the properties of which approximate the properties of a sequence of random numbers so as not to be based on the unique identifier. In this way, a pseudo-random merge identifier can be provided for conversation merging and/or home-access merging operations without exposing account-access information (e.g., the unique identifier) to other users.

Although a pseudo-random merge identifier is described herein in connection with various examples, in other examples, the merge identifier may be one of the account aliases, a modification (e.g., a hash) of one or more account aliases, a permanent identifier of the sender such as the unique account identifier, a modification (e.g., a hash) of the permanent identifier of the sender, a public key associated with the sender, a modification (e.g., a hash) of the public key associated with the sender, a combination (e.g., a concatenation or a hash) of the permanent identifier and the public key associated with the sender, a combination (e.g., a concatenation or a hash) of the public key associated with the sender and another public key (e.g., public keys for multiple devices of the sender), or a sender-generated encrypted signature (as examples).

Server 120 may generate the merge identifier (e.g., responsive to a registration event for a user registering one or more account aliases to a user account) or server 120 may receive the merge identifier from a user device or from another server such as an account server that generates the merge identifier.

It should be appreciated that some account information and/or identifying information such as merge identifiers for various users may be generated and/or temporarily or permanently stored locally by electronic device 110, electronic device 115, and/or home-control device 117 for management of messaging and/or home-control access. For example, when electronic device 115 receives a message from an account alias of a remote user (e.g., a user of electronic device 110), in order to decrypt the received message, electronic device 115 may query the server 120 for the account alias that sent the incoming message. Responsive to the query, server 120 looks up the merge identifier for that account alias and includes the merge identifier in the response to the query (e.g., along with information such as a public key pertaining to the message). Electronic device 115 may then store the merge identifier in association with the account alias of the incoming message so that later messages from other account aliases associated with the same merge identifier can be displayed together with the incoming message (e.g., in a common messaging stream or conversation).

Figure 2:
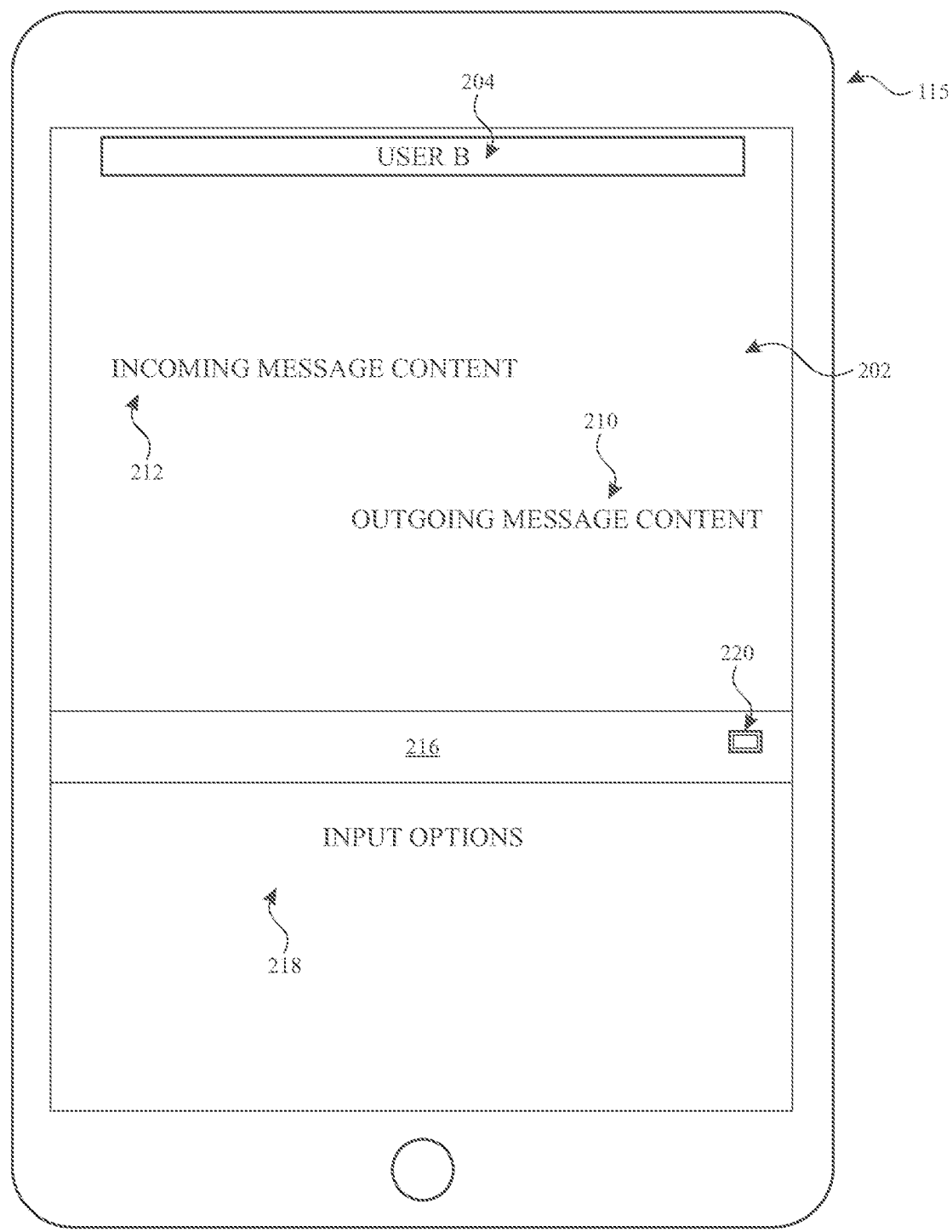
FIG. 2 illustrates a schematic diagram showing an exemplary user interface view during messaging with a messaging application in accordance with one or more implementations.
Figure 3:
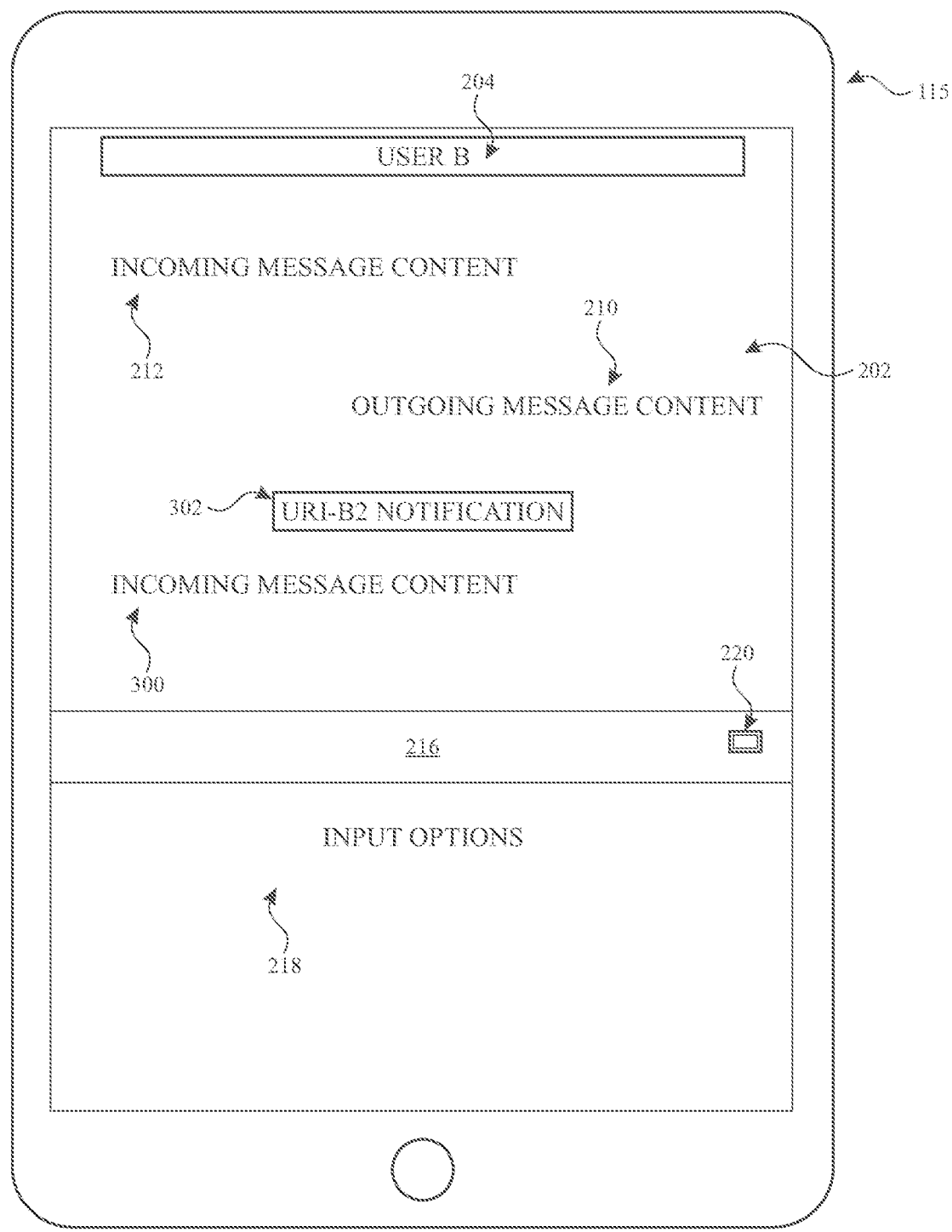
FIG. 3 illustrates a schematic diagram showing another exemplary user interface view during messaging with a messaging application in accordance with one or more implementations.
Figure 4:
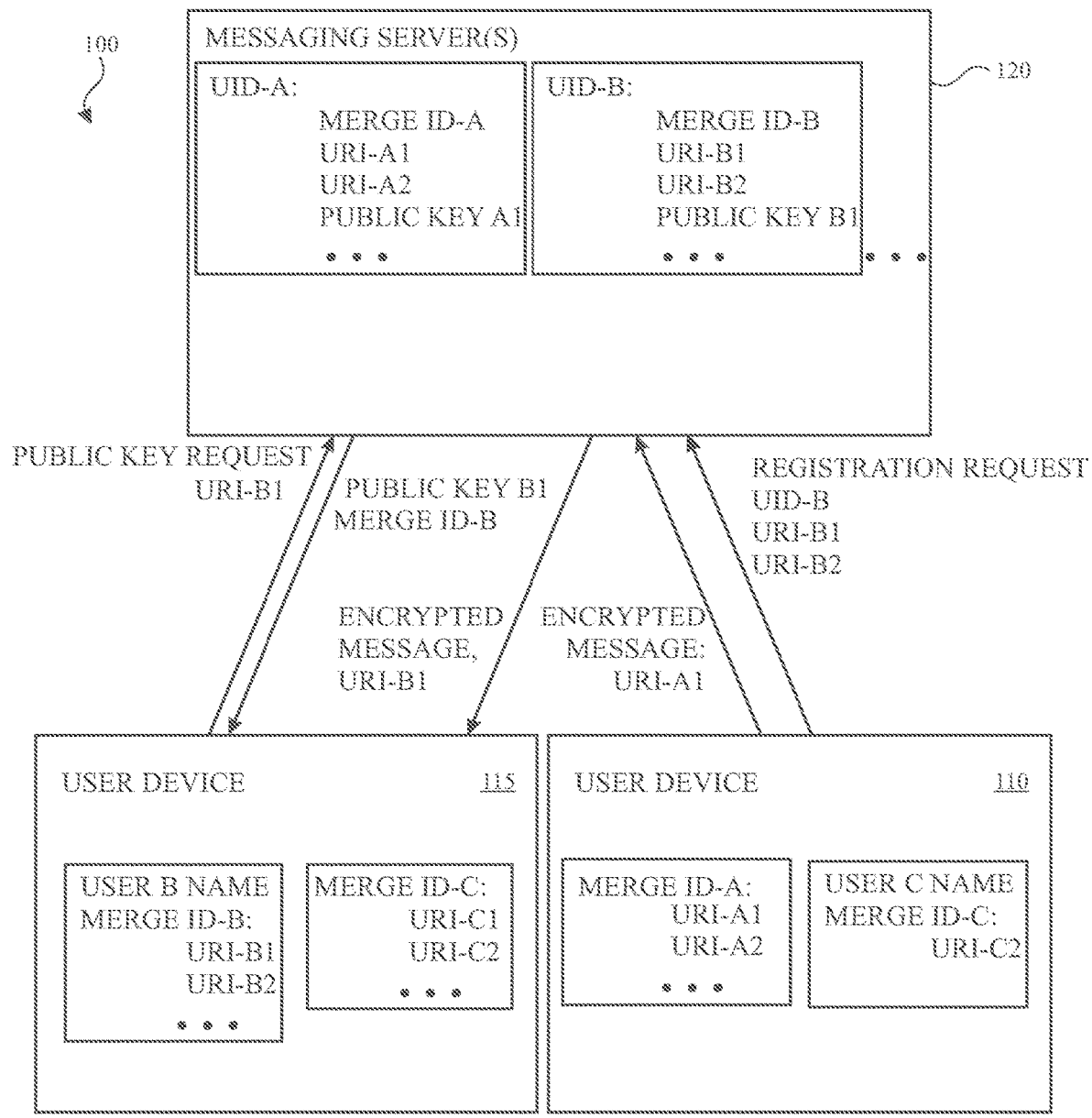
FIG. 4 illustrates various data exchange operations for a messaging conversation in accordance with one or more implementations.

FIGS. 2 and 3 show user interface views during a messaging session between a user (e.g., a user "A") of electronic device 115 and another user (e.g., a remote user such as user "B" of electronic device 110). Various data exchanges for the managing the messaging session illustrated in FIGS. 2 and 3 are shown in FIG. 4.

In the example of FIG. 2, the user of electronic device 115 (e.g., user A) has received an incoming message including incoming message content 212 from user B and sent an outgoing message including outgoing message content 210 to user B. The incoming message may include incoming message content 212 and an account alias from which the incoming message was received. As shown, incoming message content 212 and outgoing message content 210 are displayed as an active messaging conversation or messaging session in message stream view 202 (e.g., of a messaging application running on electronic device 115).

As shown in FIG. 2, the messaging application can include message stream view 202, an input display including input options 218, and a send option 220 for sending messages being composed in an input field 216. Input options 218 may include an (physical or virtual) alphanumeric keyboard and/or other options for including content other than alphanumeric content such as emojis, stored images, handwritten input, or cloud-based animated images in an outgoing message. Alphanumeric text (when entered) and/or the emojis, stored images, or cloud-based animated images (when selected) appear in the input field 216 until the send option 220 is selected to send the message.

In the example of FIG. 2, the message stream view 202 for the active messaging conversation with user B is displayed in association with a conversation identifier 204 for the conversation with user B (e.g., "USER B"). The conversation identifier 204 may be the account alias (e.g., the phone number or email address) from which the incoming message including incoming message content 212 was received or may be a local identifier (e.g., a name of user B or an organization of user B) that is stored in an address book locally on electronic device 115. For example, the user of electronic device 115 may create an address book entry for user B that includes the local identifier "USER B" and the telephone number of user B. When a message is received from the telephone number of user B, the messaging application accesses the address book entry, obtains the local identifier "USER B" associated with the telephone number, and displays the local identifier to identify the conversation including incoming message content 212 and outgoing message content 210. If no local identifier is stored for the telephone number (e.g., the user has not created an address book entry for user B), the account alias itself (e.g., the phone number) from which the incoming message content 212 was received may be displayed as conversation identifier 204. In some scenarios, conversation identifier 204 identifies a group messaging conversation. A conversation identifier for a group messaging conversation may include one or more aliases, one or more local identifiers, and/or a local group name associated with the users sending and/or receiving messages in the group messaging conversation.

Although no indication is shown in FIG. 2, when incoming message content 212 was received, electronic device 115 also received (e.g., from server 120 as part of decryption operations for incoming message content 212) a merge identifier associated with the account alias from which incoming message content 212 was received. Electronic device 115 stored both the merge identifier and the account alias from which incoming message content 212 was received (e.g., in association with the local identifier "USER B" if one exists).

In the example of FIG. 3, a new incoming message including incoming message content 300 has been received from user B (e.g., from electronic device 110 or another device of user B). However, the incoming message including incoming message content 300 includes a different account alias (e.g., an email address) of user B. The different account alias is represented as "URI-B2" (uniform resource identifier B2) in FIG. 3. In connection with the receipt and processing of incoming message content 300 (e.g., responsive to a query to server 120 for information to facilitate decryption of incoming message content 300) electronic device 115 again receives the merge identifier for user B, but this time in connection with the different account alias. For example, electronic device 115 may transmit, responsive to receipt of the message including incoming message content 300 and to server 120, a request for information pertaining to the message including incoming message content 300, the request comprising the different account alias. Electronic device 115 may then receive, from server 120, the requested information (e.g., one or more public keys for the message such as a public key with which the message was encrypted and/or signed for electronic device 115) and the merge identifier associated with the different account alias.

Electronic device 115 determines, based on the receipt of the same merge identifier as the merge identifier received in association with incoming message content 212, that the incoming messages including incoming message content 212 and incoming message content 300 were both sent by user B, even though the two incoming messages were received from different account aliases. When electronic device 115 determines that the incoming messages including incoming message content 212 and incoming message content 300 were both sent by user B, the incoming message content 300 is displayed in the same messaging conversation with incoming message content 212 and outgoing message content 210, along with conversation identifier 204.

As shown in FIG. 3, a notification 302 may also be displayed in message stream view 202 with incoming message content 300 and incoming message content 212 to notify the user or electronic device 115 that incoming message content 300 was received from a different account alias for user B (e.g., account alias URI-B2 such as an email address for user B). Displaying notification 302, incoming message content 212 from the first account alias, outgoing message content 210 to the first account alias, and incoming message content 300 from the second account alias in the same conversation thread merges incoming message content 300 into the conversation thread that includes the previously received incoming message content 212.

When a new outgoing message is sent to user B, the new outgoing message may be sent to account alias URI-B2 until a new message from the account alias associated with incoming message content 212 sends another message.

In this regard, it should be appreciated that the user of electronic device 115 (e.g., user A) and user B may have previously had a messaging conversation using account alias URI-B2 of user B, that was not associated with a merge identifier (e.g., because the merge identifier for user B had not yet been generated or because the software running on electronic device 115 at the time of the earlier conversation was not updated to accept and utilize a merge identifier). When the merge identifier is received for URI-B2 in connection with incoming message content 300, electronic device 115 may identify a stored (e.g., previous) conversation thread associated with URI-B2, the stored conversation thread including one or more additional previously received messages. When a stored (e.g., previous) conversation thread associated with account alias URI-B2 is identified, and that account alias is newly associated with a merge identifier for a different or current conversation thread, electronic device 115 may merge the additional previously received messages into the conversation thread with incoming message content 212, outgoing message content 210, and incoming message content 300.

In order to merge the messages associated with the first account alias and the second account alias that are both associated with a common merge identifier into a common message stream view 202 with a single conversation identifier 204, electronic device 115 may maintain separate backend conversations for each account alias. For example, electronic device 115 may maintain (e.g., store and update) a separate time-ordered sequence of message content exchanged between user A of electronic device 115 and each account alias of user B. When the user views the messaging conversation with user B (e.g., by selecting the messaging conversation associated with conversation identifier 204, sending a new message to user B, or opening a new message received from user B), electronic device 115 merges the two stored backend conversations into a single merged (e.g., active) messaging conversation for display by generating an ordered combination of the message content in the first backend conversation and the message content in the second backend conversation, ordered by the receipt/sent time for each message.

In some implementations as noted herein, server 120 of FIG. 1 may be implemented as a messaging server that manages the secure exchange of messages between devices such as electronic devices 115 and 110. FIG. 4 illustrates various exemplary exchanges of data between server 120 and electronic devices 115 and 110 for a secure message exchange with conversation merging.

As shown in FIG. 4, server 120 may receive a registration event message such as a reservation request for a user account of user B (e.g., from electronic device 110). In the example of FIG. 3, the registration request includes an identifier of the user account (e.g., a unique identifier UID-B) and one or more account aliases (e.g., URI-B1 and URI-B2) of the user account. In this example, the registration event message is a request to register two account aliases to an existing account identified by unique identifier UID-B. However, the registration event may also be an initial registration request that does not include a unique identifier, responsive to which the unique identifier UID-B may be generated by server 120.

In the example of FIG. 4, because UID-B is associated with more than one account alias, server 120 generates a merge identifier MERGE ID-B for the user account responsive to receipt of the registration event message. The merge identifier may be generated when, multiple account aliases are registered in a single registration event, when a single new account alias is added to an account with an existing account alias, or a merge identifier may be generated for every user account regardless of the number of associated account aliases. In one example, the registration event may include a login event to a user account from a smartphone having a telephone number associated with a subscriber identity module (SIM) installed in the smartphone. The login event may add one or more email addresses associated with the user account to the telephone number of the user in the user account, responsive to which the server generates the merge identifier in association with both the telephone number and the email address. The merge identifier may persist at the server when the user logs out of the user account or the merge identifier may be deleted or unlinked from the telephone number when the email address is no longer actively associated with the phone number. The merge identifier MERGE ID-B may be a pseudo-random merge identifier or any other merge identifier as described herein.

As shown, server 120 stores the merge identifier MERGE ID-B in association with the identifier UID-B of the user account of user B and the first and second account aliases URI-B1 and URI-B2 of the user account. Server 120 may also store public encryption information for encrypting messages for user B such as a public key PUBLIC KEY B1 (e.g., associated with electronic device 110 of user B). As shown, server 120 may store unique identifiers, merge identifiers, account aliases, and public keys for many user accounts, including an account of user A of electronic device 115 (e.g., including unique identifier UID-A for the account, merge identifier MERGE ID-A, account aliases URI-A1 and URI-A2 such as phone number and an email address, and a public key PUBLIC KEY A1).

When user B sends a message to user A, user B may send the message to the first account alias URI-A1 of user A by requesting the public key PUBLIC KEY A1 for user A from server 120, encrypting the message content to be sent using the received public key and/or other information (e.g., using a symmetric encryption process such as an advanced encryption system (AES) encryption process, an asymmetric encryption process such as a Rivest-Shamir-Adleman (RSA) encryption process, or an encryption process that combines aspects of symmetric, asymmetric, AES, RSA, and/or other encryption processes), and sending the encrypted message to server 120 for delivery to account alias URI-A1. Server 120 provides the encrypted message to electronic device 115 along with the account alias (e.g., URI-B1 of user B) from which the encrypted message was sent.

In order to decrypt the encrypted message, electronic device 115 sends a query corresponding to the encrypted message that was transmitted using the account alias URI-B1 to server 120, the query indicating account alias URI-B1 and including a request (e.g., PUBLIC KEY REQUEST) for information associated with the message. For example, electronic device 115 may request information such as one or more keys (e.g., PUBLIC KEY B1 of user B in FIG. 3) for decryption and/or verification of the encrypted message. In various examples, the information that is requested may include user B's public key PUBLIC KEY B1, user A's public key PUBLIC KEY A1, an encrypted message key, and/or other information for decryption and/or verification of the encrypted message.

Server 120 then provides, responsive to the query, the information (e.g., the PUBLIC KEY B1 and/or an encrypted message-specific key) and the merge identifier MERGE ID-B associated with the account alias URI-B1 that sent the encrypted message. Electronic device 115 then decrypts and/or verifies the encrypted message (e.g., using the received information, and/or a private key for user A that is stored at electronic device 115) and uses MERGE ID-B to display the decrypted message in a merged conversation if there are previous messages associated with MERGE ID-B.

As shown in FIG. 4, in addition to decrypting and displaying the received message, electronic device 115 also stores the received merge identifier MERGE ID-B in association with the received account alias URI-B1 and any other account aliases previously received in connection with that merge identifier (e.g., URI-B2). In the example of FIG. 4, the merge identifier and account aliases for user B are stored in connection with a local identifier USER B NAME for user B such as a name in an address book entry for user B. However, FIG. 4 also shows how information associated with another user C (e.g., a merge identifier MERGE ID-C and two account aliases URI-C1 and URI-C2) are stored at electronic device 115 without a local identifier for user C. In contrast, electronic device 110 of user B has a local identifier USER C NAME stored for user C and stores merge identifier MERGE ID-C and first account alias URI-C1 for user C in connection with that name (although electronic device 110 is not yet aware of the second account alias URI-C2 for user C).

FIG. 4 also shows how electronic device 110 of user B may store information associated with user A of electronic device 115 such as a merge identifier MERGE ID-A and two account aliases URI-A1 and URI-A2 for user A. Account aliases may be stored in association with a merge identifier indefinitely or may be unbound from the merge identifier (e.g., after a predetermined amount of time since the last message was received from that account alias). In this way, if URI-C1 is an old phone number of user C and URI-C2 is new phone number of user C, messages from the new phone number will merge with messages from the old phone number, but after a period of time (e.g., eight hours, a week, or any amount of time) new messages associated with the old phone number will be unassociated with the messages from the new phone number (e.g., to prevent new messages from the new owner of the old phone number from incorrectly merging into the user C conversation), unless the merge identifier is again received from the server (e.g., if user C now has two phone numbers in active use). In this way, for example, a phone number associated with a domestic subscriber identity module and a temporary international phone number associated with an international subscriber identity module can both be used to participate in a common messaging conversation while a user is travelling internationally, without the international phone number being permanently associated with the user.

Figure 5:
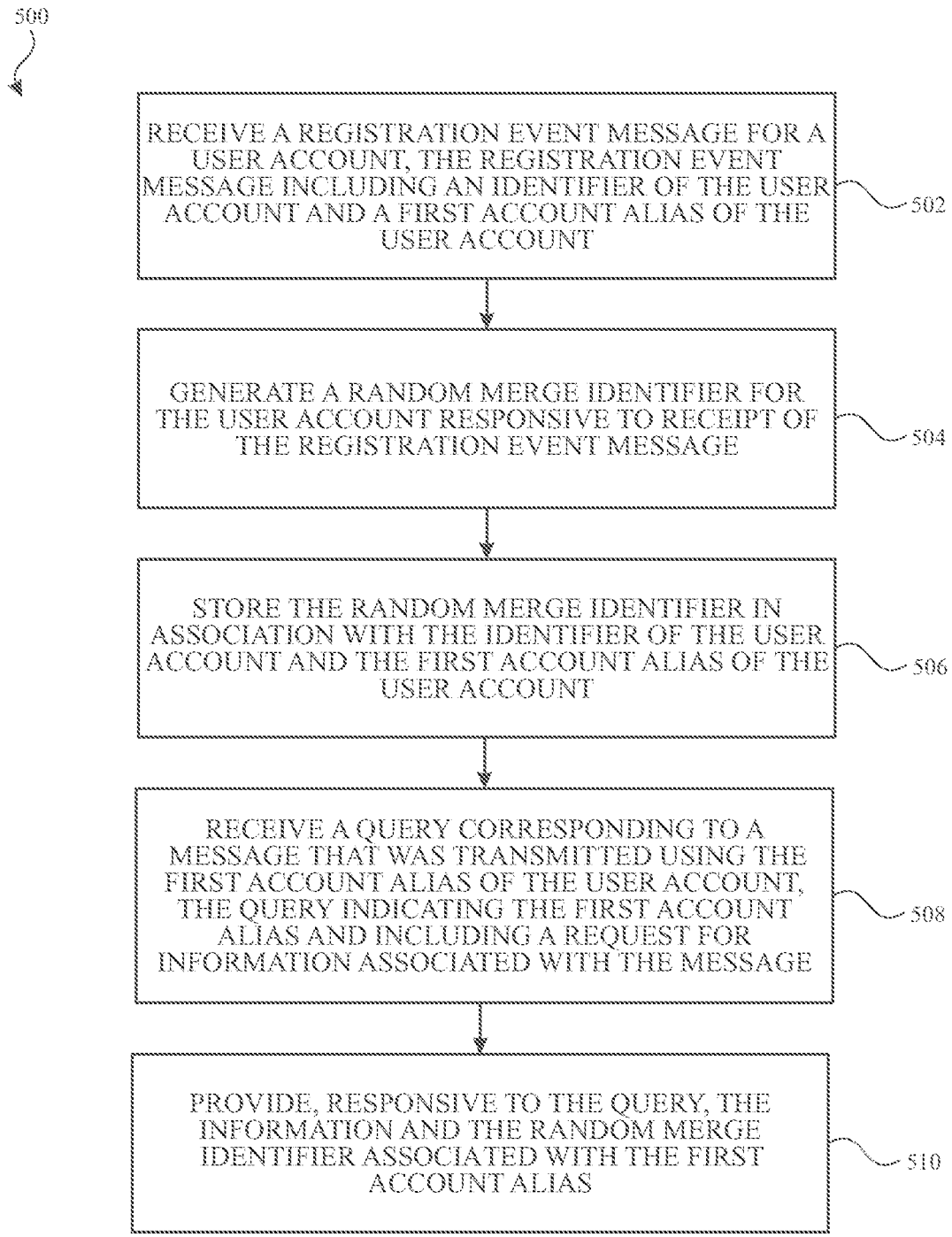
FIG. 5 illustrates a flow diagram of an example process for managing messaging operations with a messaging server in accordance with one or more implementations.

FIG. 5 illustrates a flow diagram of an example process 500 for managing messaging between devices such as electronic devices 110 and 115 in accordance with one or more implementations. For explanatory purposes, the process 500 is primarily described herein with reference to components of the components of FIG. 1 (particularly with reference to server 120), which may be executed by one or more processors of the server 120 of FIG. 1. However, the process 500 is not limited to the server 120, and one or more blocks (or operations) of the process 500 may be performed by one or more other components of other suitable devices, such as one or more of the electronic device 110 or the electronic device 115. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, a server 120 such as a messaging server receives a registration event message for a user account. The registration event message includes an identifier (e.g., a unique identifier such as UID-B) of the user account and a first account alias (e.g., URI-B1) of the user account.

At block 504, the server generates a merge identifier (e.g., MERGE ID-B) such as a pseudo-random merge identifier for the user account, responsive to receipt of the registration event message. The server may also receive a second account alias (e.g., URI-B2) of the user account and store the second account alias in association with the merge identifier, the first account alias, and the identifier of the user account. The merge identifier, the account aliases, and/or the unique identifier may be stored in association with a public key for the user account.

At block 506, the server stores the merge identifier in association with the identifier of the user account and the first account alias of the user account. Although the merge identifier is generated, in this example, by the messaging server, it should be appreciated that the merge identifier may be generated by another server (e.g., an account server or a cloud server) and provided to the messaging server for storage.

At block 508, the server receives a query corresponding to a message that was transmitted using the first account alias of the user account, the query indicating the first account alias and including a request for information associated with the message. The information associated with the message may include a public key for decryption of the message. Before or after receiving the query, the server may receive a second query corresponding to a second message that was transmitted using the second account alias (e.g., URI-B2) of the user account, the query indicating the second account alias and including a second request for information associated with the second message.

At block 510, the server provides responsive to the query, the information and the merge identifier associated with the first account alias. If a second request is received, the server provides, responsive to the second query, the information associated with the second message and the merge identifier associated with the first account alias and the second account alias.

Figure 6:
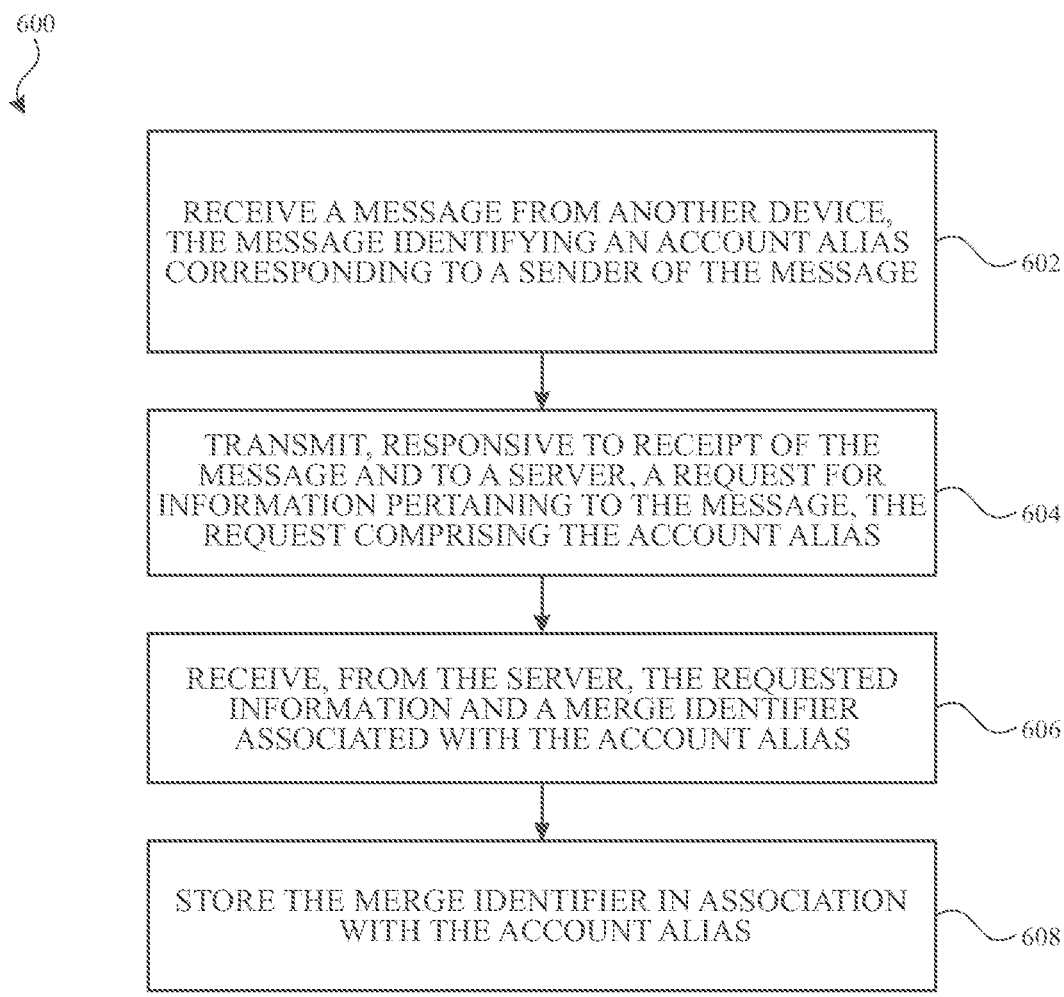
FIG. 6 illustrates a flow diagram of an example process for receiving an incoming message with a messaging application in accordance with one or more implementations.

FIG. 6 illustrates a flow diagram of an example process 600 for receiving a message from an account alias having an associated merge identifier in accordance with one or more implementations. For explanatory purposes, the process 600 is primarily described herein with reference to components of the components of FIG. 1 (particularly with reference to electronic device 115), which may be executed by one or more processors of the electronic device 115 of FIG. 1. However, the process 600 is not limited to the electronic device 115, and one or more blocks (or operations) of the process 600 may be performed by one or more other components of other suitable devices, such as one or more of the electronic device 110 or the server 120. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, an electronic device such as electronic device 115 receives a message from another device such as electronic device 110, the message identifying an account alias (e.g., URI-B2) corresponding to a sender (e.g., user B) of the message. The message may be an incoming message that includes incoming message content 300 as described above in connection with FIG. 3. In some scenarios, the message may be a group message that also includes a recipient account alias for another recipient of the message.

At block 604, the electronic device transmits, responsive to receipt of the message and to a server such as server 120, a request for information (e.g., a public key) pertaining to the message. The request includes the account alias received with the message.

At block 606, the electronic device receives, from the server, the requested information and a merge identifier (e.g., MERGE ID-B) associated with the account alias. The merge identifier may be a pseudo-random identifier stored on the server in association with an account identifier (e.g., UID-B) corresponding to the account alias and another account alias. However, in various scenarios, the merge identifier may include at least one of: a pseudo-random identifier, the account alias, a modification of the account alias, a permanent identifier of the sender, a modification the permanent identifier of the sender, a public key associated with the sender, a modification of the public key, a combination of the permanent identifier and the public key, a combination of the public key and another public key, or a sender-generated encrypted signature. The merge identifier may have been generated by the server 120, another server, or the sender.

At block 608, the electronic device stores the merge identifier in association with the account alias. The electronic device may also determine whether the merge identifier was previously received in association with another account alias (e.g., a URI-B1) corresponding to a previously received message (e.g., including incoming message content 212). The electronic device may also associate the received message with the previously received message when it is determined that the merge identifier was previously received in association with the other account alias. The electronic device may also store the other account alias in association with the merge identifier and the account alias when it is determined that the merge identifier was previously received from the server in association with the other account alias. One or both of the account alias and the other account alias may be unbound from the merge identifier after a predetermined period of time (e.g., a number of seconds, minutes, hours, days, a week, or a number of weeks) in which no messages are received from that account alias.

The electronic device may also decrypt and/or verify the message using the public key and/or other information and merge the received message into a conversation thread that includes the previously received message when the received message is associated with the previously received message. Merging the received message into the conversation thread that includes the previously received message may include displaying a notification (e.g., notification 302), in the conversation thread, of a new sender alias (e.g., URI-B2) associated with the conversation thread, and displaying the received message in the conversation thread. In addition to merging the newly received message into the conversation thread, the electronic device may also identify a stored conversation thread associated with the other account alias, the stored conversation thread including one or more additional previously received messages. If a stored conversation thread associated with the other account alias is identified, the electronic device may also merge the one or more additional previously received messages into the conversation thread.

When messages are received from multiple account aliases associated with a common merge identifier, the electronic device may maintain a first backend conversation associated with the first account alias (e.g., URI-B1) and the merge identifier. The electronic device may also maintain a second backend conversation associated with the other account alias (e.g., URI-B2) and the merge identifier. When a user input is received for viewing a messaging conversation (e.g., when a new message is sent to or received from either of the account alias or the other account alias), the electronic device may provide, for display (e.g., in a messaging application), a single merged conversation (e.g., as shown in message stream view 202 of FIG. 3) corresponding to the conversation thread, by generating an ordered combination of the first backend conversation and the second backend conversation (e.g., by ordering the individual messages according to the time of transmission and/or receipt for that message).

As noted above, in some scenarios a group message may include one or more additional recipient account aliases. In these scenarios, the electronic device displays the message in a group conversation thread associated with the account alias of the sender and the recipient account aliases. In a group messaging scenario, the electronic device may also receive an additional message from an additional other device (e.g., a device of user C), the additional message identifying the recipient account alias (e.g., URI-C1) as corresponding to a sender of the additional message and including the account alias (e.g., URI-B2) of the sender of the message. In this scenario, the user device transmits, responsive to receipt of the additional message and to the server 120, an additional request for additional information (e.g., the public key) pertaining to the additional message. This additional request may include the recipient account alias URI-C1. The electric device may receive, from the server, the requested additional information and an additional merge identifier (e.g., MERGE ID-C) associated with the recipient account alias. The electronic device may then store the additional merge identifier in association with the recipient account alias.

The electronic device may also generate a group merge identifier for the group conversation thread (e.g., based on the merge identifier and the additional merge identifier). The electronic device may then display the additional message in the group conversation thread. The electronic device may generate the group merge identifier by concatenating and/or hashing the merge identifier and the additional merge identifier. In this way, merge identifiers of multiple users in a group chat may be used to ensure that any account alias of any of the multiple users can be used to include messages within that same group chat.

In this group messaging scenario, the electronic device may receive another additional message from the additional other device, the other additional message identifying another account alias (e.g., URI-C2) and including the account alias (e.g., URI-B2) of the sender of the message. In this group messaging scenario, the electronic device may transmit, responsive to receipt of the other additional message and to the server, another additional request for further additional information pertaining to the other additional message, the other additional request comprising the other account alias. The electronic device may receive, from the server, the requested further additional information and the additional merge identifier (e.g., MERGE ID-C) associated with the other account alias. The electronic device may store the other account alias in connection with the additional merge identifier and the recipient account alias. The electronic device may also store the other account alias in connection with the group merge identifier. The electronic device may display the other additional message in the group conversation thread (e.g., based on the receipt of the additional merge identifier associated with the other account alias).

Figure 7:
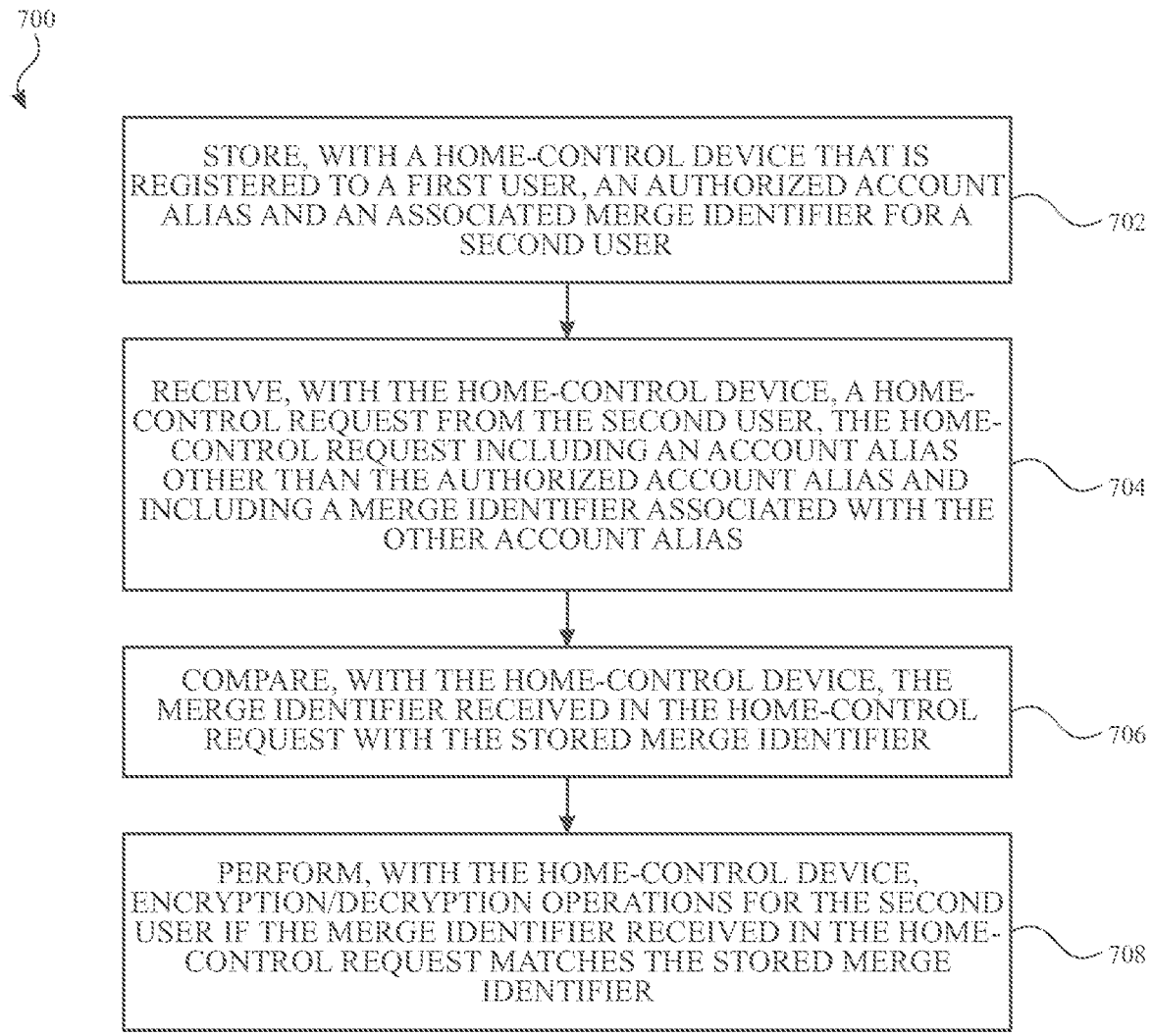
FIG. 7 illustrates a flow diagram of an example process for home-control operations based on a merge identifier in accordance with one or more implementations.

FIG. 7 illustrates a flow diagram of an example process 700 for using a merge identifier for managing home-control access with a home-control device in accordance with one or more implementations. For explanatory purposes, the process 700 is primarily described herein with reference to components of the components of FIG. 1 (particularly with reference to home-control device 117 and smart appliance 119), which may be executed by one or more processors of the home-control device 117 of FIG. 1. However, the process 700 is not limited to the home-control device 117, and one or more blocks (or operations) of the process 700 may be performed by one or more other components of other suitable devices, such as one or more of the electronic device 110, the electronic device 115, or the server 120. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a home-control device such as home-control device 117 that is registered to a first user (e.g., user A), stores an authorized account alias (e.g., URI-B1) and an associated merge identifier (e.g., MERGE ID-B) for a second user such as user B. For example, user A may grant user B permission to operate home-control device 117 with a remote device such as electronic device 115, by identifying user B as an authorized using having an account alias URI-B1. At the time that user B is identified as an authorized user, or responsive to a home-control request from account alias URI-B1 of user B, a server such as server 120 may provide home-control device 117 with the merge identifier associated with URI-B1 for storage at the home-control device.

At block 704, the home-control device may receive a home-control request from the second user. However, the home-control request may include an account alias (e.g., URI-B2) other than the authorized account alias and a merge identifier associated with the other account alias. The home control request may be a request to control an appliance such as smart appliance 119 that is communicatively coupled to the home-control device. In one suitable example, the appliance is a light fixture including a light bulb. The light fixture and/or light bulb includes communications components for wired or wireless communication with home-control device 117. In this example, the home-control request may include a request to change a brightness of the light bulb.

At block 706, the home-control device compares the merge identifier received in the home-control request with the stored associated merge identifier.

At block 708, the home-control device performs authorization (encryption/decryption or identity verification) operations for the second user if the merge identifier received in the home-control request matches the stored associated merge identifier. If the authorization operations are successful, home-control device 117 provides secure home-control access to the second user (e.g., based on the encryption information). Providing secure home-control access may include changing the brightness of the at least one light bulb responsive to the home-control request. However, providing secure home-control access may include allowing remote control by user B to any of various smart appliances as described herein.

Figure 8:
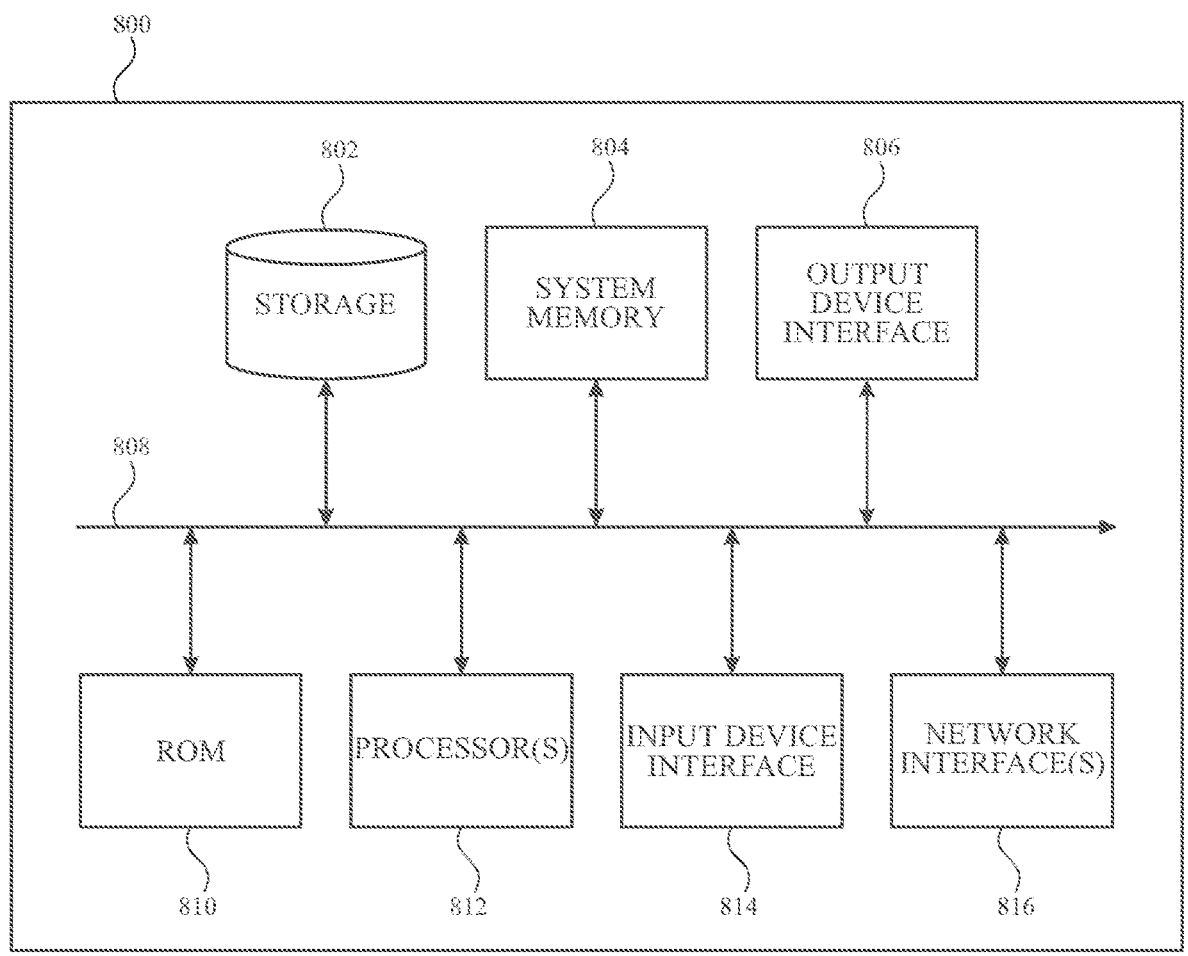
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, the electronic device 115, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 115 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

In accordance with various aspects of the subject disclosure, a method is provided that includes receiving a registration event message for a user account, the registration event message including an identifier of the user account and a first account alias of the user account. The method also includes generating a merge identifier for the user account responsive to receipt of the registration event message. The method also includes storing the merge identifier in association with the identifier of the user account and the first account alias of the user account. The method also includes receiving a query corresponding to a message that was transmitted using the first account alias of the user account, the query indicating the first account alias and including a request for information associated with the message. The method also includes providing, responsive to the query, the information and the merge identifier associated with the first account alias.

In accordance with various aspects of the subject disclosure, a device is provided that includes a memory and at least one processor communicatively coupled to the memory and configured to receive a message from another device, the message identifying an account alias corresponding to a sender of the message. The at least one processor is further configured to transmit, responsive to receipt of the message and to a server, a request for information pertaining to the message, the request comprising the account alias. The at least one processor is further configured to receive, from the server, the requested information and a merge identifier associated with the account alias. The at least one processor is further configured to store the merge identifier in association with the account alias.

In accordance with various aspects of the subject disclosure, a non-transitory computer-readable medium is provided that includes instructions, which when executed by at least one computing device, cause the at least one computing device to perform operations including storing, with a home-control device that is registered to a first user, an authorized account alias and an associated merge identifier for a second user. The operations also include receiving, with the home-control device, a home-control request from the second user, the home-control request including an account alias other than the authorized account alias and including a merge identifier associated with the other account alias. The operations also include comparing, with the home-control device, the merge identifier received in the home-control request with the stored associated merge identifier. The operations also include performing, with the home-control device, authorization operations for the second user if the merge identifier received in the home-control request matches the stored associated merge identifier.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   storing, for a user account, an identifier of the user account and a first account alias of the user account;
   generating a messaging alias for the user account, the messaging alias different from the identifier and the first account alias for the user account;
   storing the messaging alias in association with the identifier of the user account; and
   facilitating, based on the first account alias and the messaging alias, messaging between a user device associated with the user account and another user device.

2. The method of claim 1, wherein facilitating the messaging comprises:
   receiving a query from the other user device corresponding to a message that was transmitted using the first account alias of the user account, the query indicating the first account alias and including a request for information associated with the message; and
   providing the information and the messaging alias to the other user device responsive to the query.

3. The method of claim 1, wherein the other user device is not associated with the user account.

4. The method of claim 1, wherein facilitating the messaging comprises:
   receiving a first message from the user device for the other user device;
   providing the first message to the other user device;
   receiving a second message for the user device from the other user device; and
   providing the second message to the user device.

5. The method of claim 4, further comprising providing the messaging alias to the other user device.

6. The method of claim 5, wherein the messaging alias is a merge identifier.

7. The method of claim 1, further comprising:
   storing the messaging alias in association with the identifier of the user account, the first account alias of the user account, and a public key.

8. A system, comprising:
   a memory storing an identifier of a user account and a first account alias of the user account; and
   one or more processors configured to:
      generate a messaging alias for the user account, the messaging alias different from the identifier and the first account alias for the user account;
      store the messaging alias in the memory in association with the identifier of the user account; and
      facilitate, based on the first account alias and the messaging alias, messaging between a user device associated with the user account and another user device.

9. The system of claim 8, wherein the one or more processors are configured to facilitate the messaging by:
   receiving a query from the other user device corresponding to a message that was transmitted using the first account alias of the user account, the query indicating the first account alias and including a request for information associated with the message; and
   providing the information and the messaging alias to the other user device responsive to the query.

10. The system of claim 8 wherein the other user device is not associated with the user account.

11. The system of claim 8, wherein the one or more processors are configured to facilitate the messaging by:
   receiving a first message from the user device for the other user device;
   providing the first message to the other user device;
   receiving a second message for the user device from the other user device; and
   providing the second message to the user device.

12. The system of claim 11, wherein the one or more processors are further configured to provide the messaging alias to the other user device.

13. The system of claim 12, wherein the messaging alias is a merge identifier.

14. The system of claim 8, wherein the one or more processors are further configured to store the messaging alias in association with the identifier of the user account, the first account alias of the user account, and a public key.

15. A non-transitory machine-readable medium comprising instructions which, when executed by one or more processors cause the one or more processors to perform operations comprising:
   storing, for a user account, an identifier of the user account and a first account alias of the user account;
   generating a messaging alias for the user account, the messaging alias different from the identifier and the first account alias for the user account;
   storing the messaging alias in association with the identifier of the user account; and
   facilitating, based on the first account alias and the messaging alias, messaging between a user device associated with the user account and another user device.

16. The non-transitory machine-readable medium of claim 15, wherein facilitating the messaging comprises:
   receiving a query from the other user device corresponding to a message that was transmitted using the first account alias of the user account, the query indicating the first account alias and including a request for information associated with the message; and
   providing the information and the messaging alias to the other user device responsive to the query.

17. The non-transitory machine-readable medium of claim 15, wherein the other user device is not associated with the user account.

18. The non-transitory machine-readable medium of claim 15, wherein facilitating the messaging comprises:
   receiving a first message from the user device for the other user device;
   providing the first message to the other user device;
   receiving a second message for the user device from the other user device; and
   providing the second message to the user device.

19. The non-transitory machine-readable medium of claim 18, the operations further comprising providing the messaging alias to the other user device.

20. The non-transitory machine-readable medium of claim 19, wherein the messaging alias is a merge identifier.

* * * * *